United States Patent
Väänänen (10) Patent No.: US 7,039,128 B2
(45) Date of Patent: May 2, 2006

(54) METHOD AND ARRANGEMENT FOR SYNCHRONIZING A RECEIVER TO A QUADRATURE AMPLITUDE MODULATED SIGNAL

(75) Inventor: Janne Väänänen, Espoo (FI)

(73) Assignee: Tellabs Oy, Espoo (FI)

( * ) Notice: Subject to any disclaimer, the term of this patent is extended or adjusted under 35 U.S.C. 154(b) by 880 days.

(21) Appl. No.: 10/148,519

(22) PCT Filed: Dec. 1, 2000

(86) PCT No.: PCT/FI00/01059

§ 371 (c)(1),
(2), (4) Date: May 31, 2002

(87) PCT Pub. No.: WO01/41390

PCT Pub. Date: Jun. 7, 2001

(65) Prior Publication Data

US 2002/0181636 A1    Dec. 5, 2002

(30) Foreign Application Priority Data

Dec. 2, 1999    (FI)    .................................. 19992591

(51) Int. Cl.
*H04L 27/06*    (2006.01)
*H04L 7/00*    (2006.01)
(52) U.S. Cl. ...................................... 375/316; 375/355
(58) Field of Classification Search ................ 375/222, 375/247, 261, 286, 293, 316, 322, 324, 325, 375/329, 334, 340, 343, 346, 350, 353, 354, 375/355; 329/300, 304, 309, 349, 353; 379/93.01; 455/130, 150.1, 181.1, 230, 242.1
See application file for complete search history.

(56) References Cited

U.S. PATENT DOCUMENTS

| 3,573,624 | A | * | 4/1971 | Hartmann et al. ........... 375/230 |
| 3,638,122 | A | * | 1/1972 | Gibson ....................... 375/230 |
| 4,245,345 | A |   | 1/1981 | Gitlin et al. |
| 4,881,241 | A |   | 11/1989 | Pommier et al. |
| 5,170,413 | A |   | 12/1992 | Hess et al. |
| 5,245,611 | A |   | 9/1993 | Ling et al. |
| 5,504,774 | A | * | 4/1996 | Takai et al. .................. 375/134 |

(Continued)

FOREIGN PATENT DOCUMENTS

GB    2271693    4/1994

(Continued)

*Primary Examiner*—Tesfaldet Bocure
*Assistant Examiner*—Naheed Ejaz
(74) *Attorney, Agent, or Firm*—Hogan & Hartson, L.L.P.

(57) ABSTRACT

A method and an arrangement are provided for synchronizing a receiver into a quadrature amplitude modulated (QAM) signal. The receiver comprises a first controllable unit (601) arranged to respond to a timing control signal by controlling the timing by which a received signal is converted into demodulated complex samples. Additionally it comprises a symbol detector (603) arranged to produce, in correspondence with the complex samples, a detection decision (s) that represents a received symbol. There are elements (401, 402, 403, 404, 405, 406, 407, 408, 409, 410, 411, 412, 413, 414, 415, 602) for generating one or more complex baseband equivalent impulse response values for a QAM-channel as a correlation result by correlating complex demodulated samples with a complex correlation variable (C) derived from the detection decision (s). The sensitivity to changes caused by cables rotating the baseband equivalent impulse response and by the unknown phase difference between the transmitter upmodulator and the receiver demodulator is deleted by appropriate postprocessing of the correlation results. The timing control signal is derived from the postprocessed correlation results.

10 Claims, 5 Drawing Sheets

U.S. PATENT DOCUMENTS

| | | | |
|---|---|---|---|
| 5,513,221 A * | 4/1996 | Parr et al. | 375/344 |
| 5,517,524 A * | 5/1996 | Sato | 375/230 |
| 5,787,128 A | 7/1998 | Honkisz | |
| 6,021,161 A * | 2/2000 | Yamaguchi et al. | 375/232 |

FOREIGN PATENT DOCUMENTS

| | | |
|---|---|---|
| WO | WO-93/14587 | 7/1993 |
| WO | WO-99/23780 | 5/1999 |

* cited by examiner

METHOD AND ARRANGEMENT FOR SYNCHRONIZING A RECEIVER TO A QUADRATURE AMPLITUDE MODULATED SIGNAL

The invention concerns generally the technological field of synchronizing a receiver to an incoming signal. Especially the invention concerns the technology of generating a control signal for a receiver stage which converts an incoming signal into a stream of synchronized samples in a receiver for quadrature amplitude modulated (QAM) signals.

When a digital signal is transmitted in analog form over a distance, the receiving device must synchronize itself to the operation of the transmitting device in order to regenerate the original digital signal correctly. The receiving device must use an arrangement that is accurately enough aware of the timing of consecutive symbols in the received analog signal.

Figure 1:
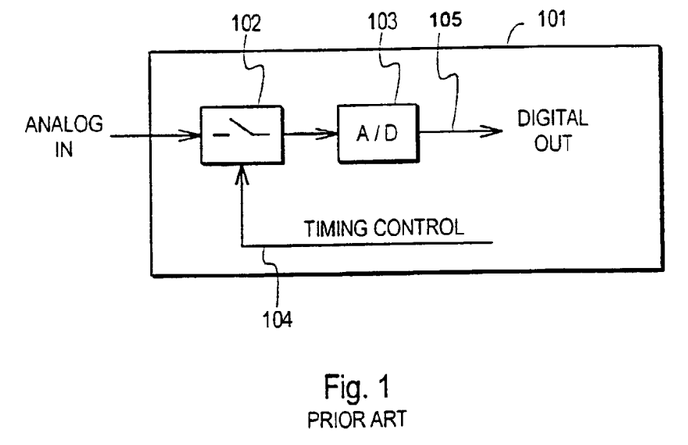
FIG. 1 illustrates a known system in which an analogue signal is converted into digital samples with controlled timing.

FIG. 1 illustrates a known principle for the conversion of an analogue input signal into a train of digital samples with a controlled timing of sampling in a receiving arrangement 101. In this case the analoque signal is sampled directly by a sampling block 102 the timing of which is controllable. The continuous analogue signal is converted into a train of consecutive analogue samples. An A/D converter block 103 converts each sample into a corresponding digital value 105. The timing of sampling used in the sampling block 102 depends on the value of the timing control signal 104.

Figure 2:
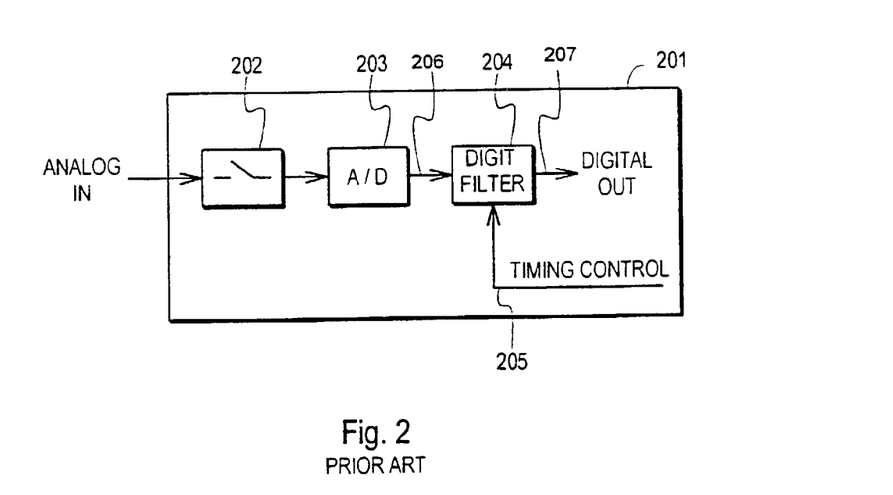
FIG. 2 illustrates another known system in which an analogue signal is converted into digital samples with controlled timing.

FIG. 2 illustrates another known principle for generating a timing controlled train of digital samples in a receiving arrangement 201. With this principle the timing of sampling is not controlled and the digital values corresponding to controlled timing instants are obtained by the means of digital signal processing. The outputs of the sampling block 202 are converted to corresponding digital values 206 by an A/D-block 203, and the final digital values 207 are constructed by a controllable digital filter 204. The output values 207 of the controllable digital filter 204 are formed by digitally interpolating the input values 206 so that the output values correspond with timing instants dictated by the timing control signal 205.

Synchronizing the receiver means that the timing control signal 104 or 205 is generated in a way that the operation of the receiver is in synchronism with that of the transmitter. The method by which the timing control signal is further used in the conversion of an analogue input signal into a train of digital values with a controlled timing is immaterial from the viewpoint of this invention.

The way of generating the timing control signal in a receiver depends on several factors, among which are the symbol frequency of the received signal and the modulation method which the transmitter used to compose the analog signal. The present invention is mainly concerned with QAM signals where bit frequencies are in the order of from megabits to tens of megabits per second.

QAM as such is known as a modulation method in which some form of amplitude modulation is used for the components of two carrier waves separated from each other by a phase difference of 90 degrees. Traditional QAM receivers have used mostly the so-called NSLM or Nonlinear Spectral Line Method to generate the timing control signal, as described for example in E. A. Lee and D. G. Messerschmitt: "Digital Communication", Kluwer Academic Publishers, 1994. However, for example in modern wireline modem connections the bit frequencies tend to be so high and the bandwidths respectively so wide that the amplitude distortion caused in the transmission channel seriously complicates the use of NSLM for effective QAM synchronization. For bandwidths of several megahertz and the copper cable lengths encountered in practical applications the upper edge of the transmission band may suffer some 20 to 35 decibels more attenuation than the lowest frequencies within the band.

The above-mentioned book describes also other known synchronization methods. In such wireline communication systems where the transmission takes place on a baseband frequency it is common to use the so-called correlation synchronization methods that rely on the principal waveform of the impulse response of the transmission channel being known. Here the concept of transmission channel must be interpreted in a wide sense so that it encompasses not only the actual cable but also the filters, line transformers and other related components in the transmitter and receiver through which the signal goes before the point in the receiver where the values of the impulse response are determined.

Figure 3A:
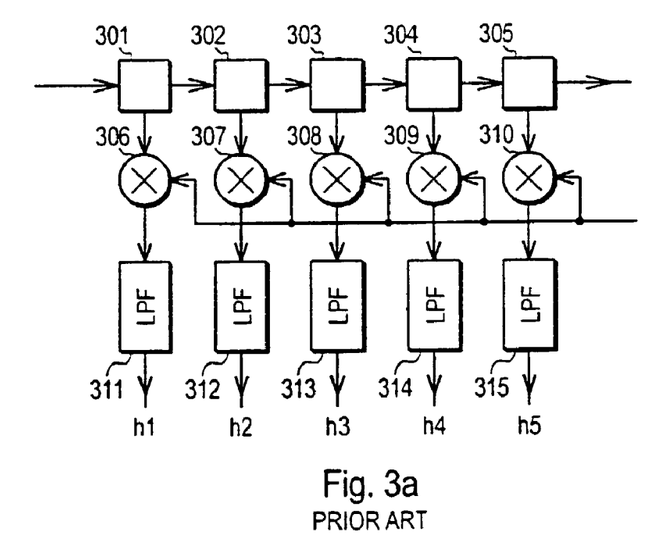
FIG. 3a illustrates a known arrangement for generating impulse response values for a baseband channel.
Figure 3B:
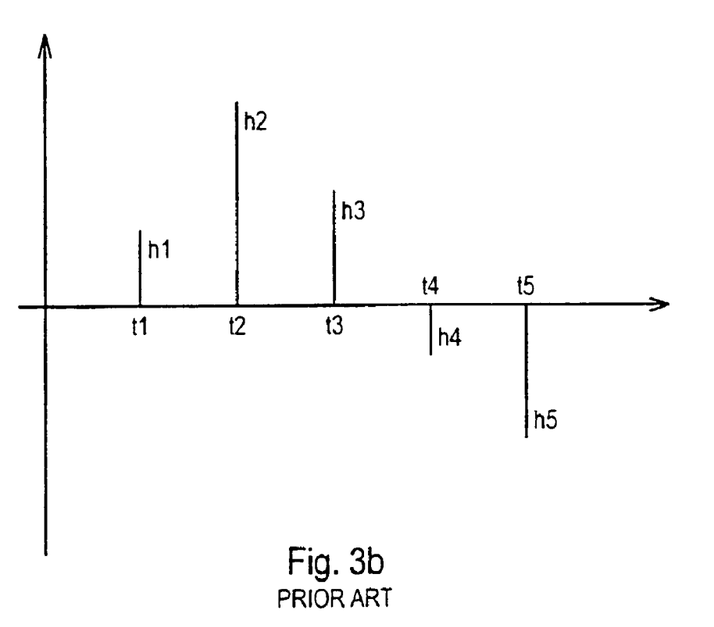
FIG. 3b shows some exemplary values obtained with the arrangement of FIG. 3a, FIG. 4 illustrates an arrangement for generating impulse response values of a baseband equivalent for a QAM-channel and auxiliary variables used in generating the timing control signal according to the invention.

FIG. 3a illustrates a known arrangement for determining five impulse response values of a channel used for PAM (Pulse Amplitude Modulation) modulated baseband transmission, e.g. 2B1Q coded transmission (two bits in one quaternary line code). A train of sequential samples is fed into a delay line where each of the five delay elements 301 to 305 holds one sample at a time. A signal detector (not shown) makes a detection decision which results in a certain real number. This real number is fed into the parallel multipliers 306 to 310, and the multiplication results are low pass filtered in the parallel low pass filters 311 to 315. We may designate the filtered outputs as h1 to h5. FIG. 3b shows the values thereof in an exemplary situation in a coordinate system where the horizontal axis represents time, vertical axis represents magnitude of the filtered results and units are arbitrary.

The timing control signal is basically formed as a modified linear combination of the values h1 to h5. A simple possibility is to take the difference h1−h3 through a PI (proportional integral) controller and use the output thereof as the timing control signal. A practical implementation might be somewhat simpler than the schematic diagram of FIG. 3a: the difference may be calculated directly from the elements of the delay line so that only one multiplier and only one low pass filter would be needed. The delay line may have multiple functions: e.g. it may simultaneously be a part of an eventual pre-equalizer in the receiver.

The known methods of correlation synchronization are well suited for CAP (carrierless amplitude phase modulation), but not applicable to QAM-based transmission, because the principal waveform of the impulse response of the QAM-related transmission channel is not known. Here one must note that the upconversion/modulation circuitry of the transmitter is regarded to be a part of the transmission channel. If we select the point of estimating the impulse response in the receiver to be before the downcoverter/demodulator circuitry (pass band case), the indeterminacy in the waveform of the channel's impulse response comes from the fact that the waveform depends on the instantaneous value of the phase of the sine and cosine functions used for upconversion/modulation at the moment when the impulse is launched into the channel. In a correllation synchronisation the symbols are thought to be the "impulses" which are launched into the channel at the transmitter. At the receiver the impulse response is measured with the aid of the detected symbols. In QAM-modulated system, the phase of the sine and cosine functions used for upconversion/modulation does not necessarily remain the same in relation to successive symbols. The phase remains the same for successive symbols only if the upmodulation frequency is an integer multiple of the symbol frequency; in this case it is impossible in the receiver to differentiate if the incoming signal is QAM or CAP-modulated.

It is an object of the present invention to provide a method and arrangement for synchronizing a receiver into a QAM-modulated signal without the problems of prior art explained in the foregoing description.

The objects of the invention are achieved by determining both the real and the imaginary parts of the impulse response of the baseband equivalent channel (or even only a part of the impulse response), by deleting the effect of the indeterminacy in the waveforms of the real and the imaginary parts and using the pulse value(s) obtained in generating a timing control signal.

In the following text a pair of samples representing the real and the imaginary parts of a signal is called a complex sample. The present invention allows the application of the principle of correlation synchronization and its advantages in QAM-modulated systems. The improvement over prior art solutions is based on the fact that the indeterminacy in the waveforms comes from unknown rotations of the complex impulse response values in the complex plane. It is possible to construct a pulse the waveform of which is determinate enough by utilising the information of both the real- and the imaginary parts of the baseband equivalent impulse response.

The method according to the invention is characterized in that it comprises the steps of
- generating one or more correlation results having a real part and an imaginary part, by correlating one or more demodulated complex samples with a complex correlation variable derived from a detection decision,
- simultaneously using both the real and imaginary parts of said correlation result to construct one or more auxiliary variables which are insensitive to changes caused by cables rotating the baseband equivalent impulse response or by the phase difference between the transmitter upmodulator and the receiver demodulator,
- generating a timing control signal from said auxiliary variables.

The invention applies also to a synchronization arrangement which is characterized in that it comprises
- means for generating one or more complex baseband equivalent impulse response values for a QAM-channel as a correlation result by correlating one or more demodulated complex samples with a correlation variable derived from a detection decision,
- means for generating a timing control signal so that information of both the real part and the imaginary part of said complex baseband equivalent impulse response values are utilised.

Additionally the invention applies to a receiver which is characterized in that it comprises
- means for deriving a complex correlation variable from a detection decision,
- means for generating one or more complex baseband equivalent impulse response values for a QAM-channel as a correlation result by correlating one or more demodulated complex samples with said correlation variable,
- means for generating a timing control signal so that information of both the real part and the imaginary part of said complex baseband equivalent impulse response values are utilised, said means being coupled so as to provide the timing control signal to a controllable demodulator and sampler unit.

In the description of prior art we pointed out that the known basic principle of correlation synchronization is not applicable to QAM-based connections because of the problems relating to indeterminate waveforms. The invention presents a way of getting around the problem, resulting in a modified correlation synchronization method and arrangement that is well suited for QAM-modulated signals even with wide transmission bands.

We now consider moving the point of estimating the impulse response further in the receiver to the baseband stages after the downconversion/demodulation. Then we actually consider an equivalent baseband channel which is complex valued having real and imaginary parts. Equivalent base-band channel as such is a commonly used concept in analysis and simulation tasks of QAM- or CAP-modulated systems (as is described e.g. in E. A. Lee and D. G. Messerschmitt: "Digital Communication", Kluwer Academic Publishers, 1994). Moving to the baseband removes the problem of indeterminate upmodulating carrier phase with respect to the successive symbols, but this alone does not entirely solve the problem of indeterminate impulse response of the transmission channel, which now contains also the demodulator. One of the reasons thereto is the unknown phase difference between the upmodulating and demodulating carrier waves in the transmitter and the receiver, respectively. Another reason is the phase rotation originating in the transmission cable; the amount of phase rotation depends on the transfer function of the cable at the transmission frequency band, and it is impossible to differentiate in the receiver between phase rotation due to the cable and the genuine transmitter-receiver phase difference referred to above. Due to the mentioned reasons the principal waveforms of both the real and the imaginary parts of the impulse response of the baseband equivalent channel for QAM modulated systems are basically indeterminate.

A first step of performing complex correlation is to multiply the stored sequential complex sample(s) representing a demodulated signal with a complex correlation variable which is related to a detected complex symbol value but not the same as that value. The low-pass filtered result of the multiplication is a (number of) complex impulse response value(s) of the baseband equivalent channel. The properties of the cable transfer function at the signal band and the unknown phase difference between the transmitter's upmodulator and the receiver's demodulator causes the real part and the imaginary part of the impulse response value(s) to be too indeterminate to be alone used for the generation of the timing control signal. So a second step is to construct an auxiliary variable or variables which is/are determinate enough by utilising the information of both the real and the imaginary parts of the complex value(s) representing the baseband equivalent impulse response.

A simple way to construct the auxiliary variable(s) is:

auxiliary variable=(real part of impulse resp)$^2$+(complex part of impulse resp)$^2$.

The auxiliary variable (real or complex) can be constructed by many other ways too, but the common feature of all the methods according to this invention to contruct the auxiliary variable is the fact that both the real part and the imaginary part of the baseband equivalent impulse response value(s) are used.

The auxiliary variable(s) obtained can basically be used in the generation of a timing control signal exactly as in previously known correlation synchronization methods.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIGS. 1 to 3b have been treated above in association with prior art, so the following description of the invention will focus on FIGS. 4 to 7.

Figure 4:
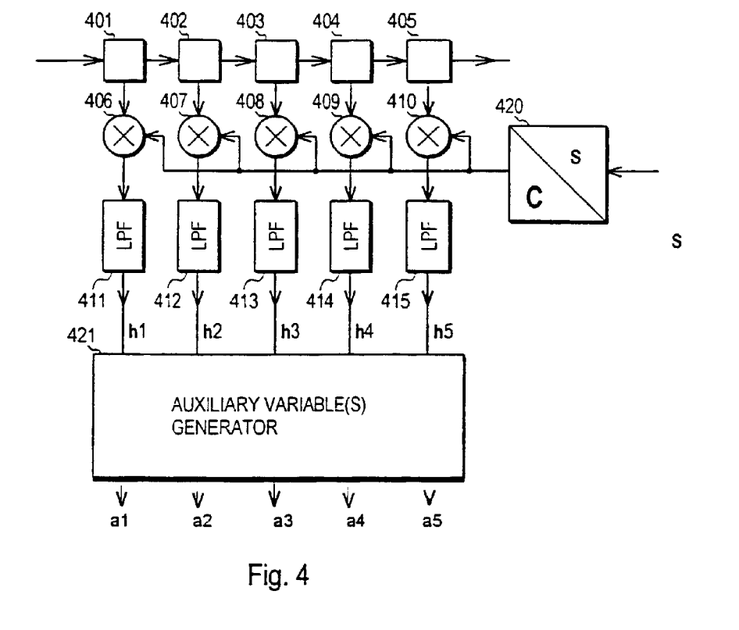

FIG. 4 illustrates an arrangement according to an embodiment of the invention for determining five complex baseband equivalent impulse response values of a channel used for QAM modulated transmission and the corresponding auxiliary variables. It should be noted that the number of the values is not necessarily five in practice, this number is used here only for exemplary purposes. A train of sequential complex samples from a demodulated signal is fed into a delay line where each of the five delay elements 401 to 405 holds one complex sample at a time. A symbol detector (not shown) makes a detection decision which results in a certain complex number, known as the detected symbol value. We may designate the detected symbol value by s. It is fed into a complex variable formulating block 420 which converts the detected symbol value into a complex variable which we will designate as C.

The complex variable C is not the same as the detected symbol value s. However, there must be a certain dependence between the two values. In order to analyze this dependency, we may write s as a+jb, where j is the imaginary unit. Some advantageous, mutually alternative rules for determining the value of C are taking the value of C to be the complex conjugate of s, i.e. C=a−jb taking C=a or C=b taking C=+k if a≧0, and C=−k, if a<0, where k is a constant taking C=+k if b≧0, and C=−k, if b<0, where k is a constant taking C=c−jd, where c=+p if a≧0 and c=−p if a<0; and d=+t if b≧0 and d=−t if b <0, where p and t are constants.

In general we may write the dependency between C and s in the form $C = z \cdot (f_1 - jf_2),$ where z is a complex constant other than zero, $f_1 = f_1(s)$ is a first real valued function of s, $f_2 = f_2(s)$ is a second real valued function of s, and the functions $f_1$ and $f_2$ are additionally related to the real and imaginary part of s=a+jb so that the sign of $f_1$ is the same as the sign of a and the sign of $f_2$ is the same as the sign of b. We must remember that real numbers are a subset of complex numbers, so even if z and C are defined to be complex numbers the imaginary part of either z or C or both may be zero.

The value of the complex variable C is taken into the parallel multipliers 406 to 410, where it separately multiplies the complex samples held in the elements 401 to 405 of the delay line respectively. The multiplication results are low pass filtered in the parallel low pass filters 411 to 415. We may designate the filtered outputs as h1 to h5, where the bold typeface emphasizes the fact that the outputs of the parallel low pass filters 411 to 415 are still in complex form.

The values h1 to h5 represent the complex samples of the baseband equivalent impulse response, and they are inputs of the element 421 which construct the auxiliary variables a1 to a5.

Figure 5A:
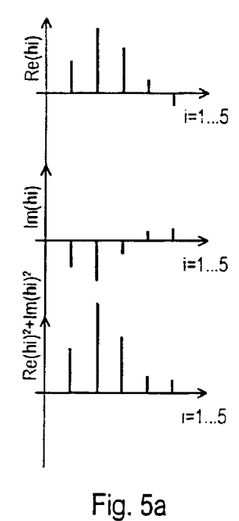
FIGS. 5a to 5c show some exemplary values obtained with the arrangement of FIG. 4.
Figure 5B:
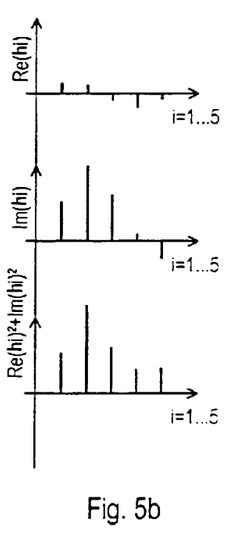
Figure 5C:
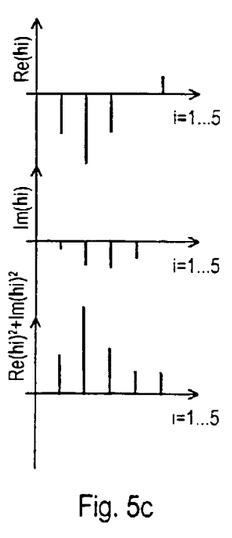

The differences between FIGS. 5a–5c illustrate the indeterminacy of the waveforms of the real and the imaginary parts of the baseband equivalent impulse response and the determinacy of auxiliary variables used in generating the timing control signal according to the invention. FIG. 5a illustrates some exemplary real parts (upmost line diagram) and imaginary parts (middle line diagram) of the baseband equivalent impulse response values h1 to h5. The vertical units are arbitrary. Additionally FIG. 5a illustrates, in the lowest line diagram, auxiliary variables constructed as the squared absolute values of the complex values h1 to h5 (sum of squares of the real and the imaginary parts). This method of constructing the auxiliary variables is not the only possible choice, but the common factor of different methods is the fact that both the real and the imaginary parts are utilised in constructing the auxiliary variable(s). Similar results are presented in FIGS. 5b and 5c but the cable and/or the phase difference between the modulating and demodulating wave functions in the transmitter and receiver has/have been changed. When the cable is changed the properties of its transfer function at the signal band are changed too. There are remarkable changes in the line diagrams representing the real and the imaginary parts of h1 to h5 from FIGS. 5a to 5c. The line diagram representing the auxiliary variables remains quite same from FIGS. 5a to 5c.

It should be noted that the auxiliary variable does not remain exactly the same when the cable is changed, but its principal waveform is determinate enough to be used for generating the timing control signal. The behaviour of the auxiliary variable is similar to the behaviour of the impulse response in a baseband transmission case (e.g. 2B1Q) when the cable is altered. In general, if we take the polar representation hi=r(cosθ+jsinθ) we may denote the generation of an auxiliary variable ai from a baseband equivalent impulse response value hi by $ai = g(hi),$ where the real or complex valued function g is selected so that $|g[r(\cos\theta + j\sin\theta)] - g[r(\cos(\theta+\phi) + j\sin(\theta+\phi))]| \geq \epsilon,$ in which limiting constraint φ is an arbitrary phase difference and ε is a small real constant the value of which is most advantageously determined through simulation and/or experimentation.

The task for generating the timing control signal starting from the auxiliary variable(s) is similar to generating a timing control signal starting from the impulse response values in a known baseband transmission case. A simple possibility is to take the difference a1–a3 through a PI (proportional integral) controller and use the output thereof as the timing control signal. In general we may note that e.g. suitably selected linear combinations of the auxiliary variables a1 to a5 combined with some kind of integrating are potential candidates for the generation of the timing control signal. The suitability of a certain linear combination as well as the potential constant coefficients used in the linear combination are most advantageously determined through simulation and/or experimentation.

When only the phase difference between the upmodulating and demodulating wave functions is changing the changes in the auxiliary variable depends on the method by which it is constructed from the real and the imaginary parts of the baseband equivalent impulse response. With the sum of squares-method used in this example, the auxiliary variable is fully insensitive to changes in the phase difference between the upmodulator and the demodulator.

Figure 6:
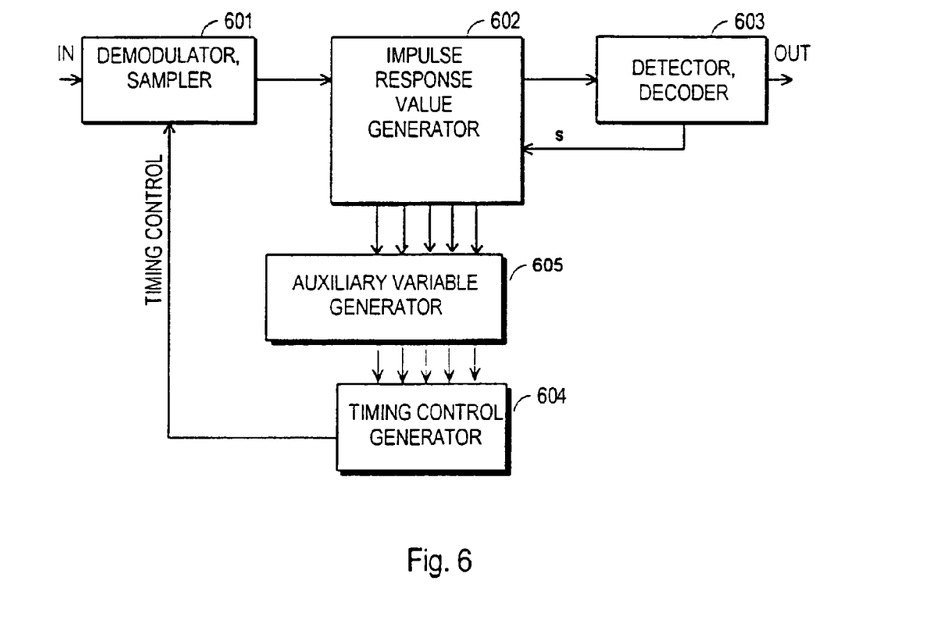
FIG. 6 illustrates schematically a syncronization arrangement according to an embodiment of the invention and FIG. 7 illustrates a method according to an embodiment of the invention.

FIG. 6 shows an embodiment of the invention where the above-explained impulse response value generation scheme is employed. In FIG. 6 a transmitter, a cable, and analog front end circuitry (line transformers, hybrids, etc.) are not shown. In a receiving device for QAM-modulated signals a first block 601 receives the signal from a transmitter, demodulates it and converts it into a sample train using either of the known arrangements shown in FIGS. 1 and 2. The demodulation stage may be placed either in front of the sampling stage or after it; the latter approach is usually employed in modem applications. If sampling is performed first and demodulation only thereafter, it should be noted that the sampling itself produces real samples which are converted into complex samples only at the demodulation step. In any case the procedure that comprises sampling and demodulation in any order produces finally a complex sample train.

The sample train goes through the baseband equivalent impulse response value generation block 602 on its way to a detector and decoder block 603. In practice the block 602 may have common parts with other signal processing elements; e.g. the delay line may be simultaneously be a part of a pre-equalizer in the receiver. The detector makes a decision for each received symbol and provides it as the signal s to the impulse response value generation block 602. The baseband equivalent impulse response value(s) generated by the impulse response value generation block 602 is/are fed into an auxiliary variable generator block 605 which constructs the auxiliary variable(s) that is/are fed into a timing control generator block 604. It generates the timing control signal which is fed into block 601 where it controls either the timing of a sampler or the operation of a controllable digital filter (these are not specifically shown in FIG. 6). The timing control signal can be basically formed as a linear combination of the auxiliary values. A simple possibility is to take a difference of two values through a PI (proportional integral) controller and use the output thereof as the timing control signal.

Figure 7:
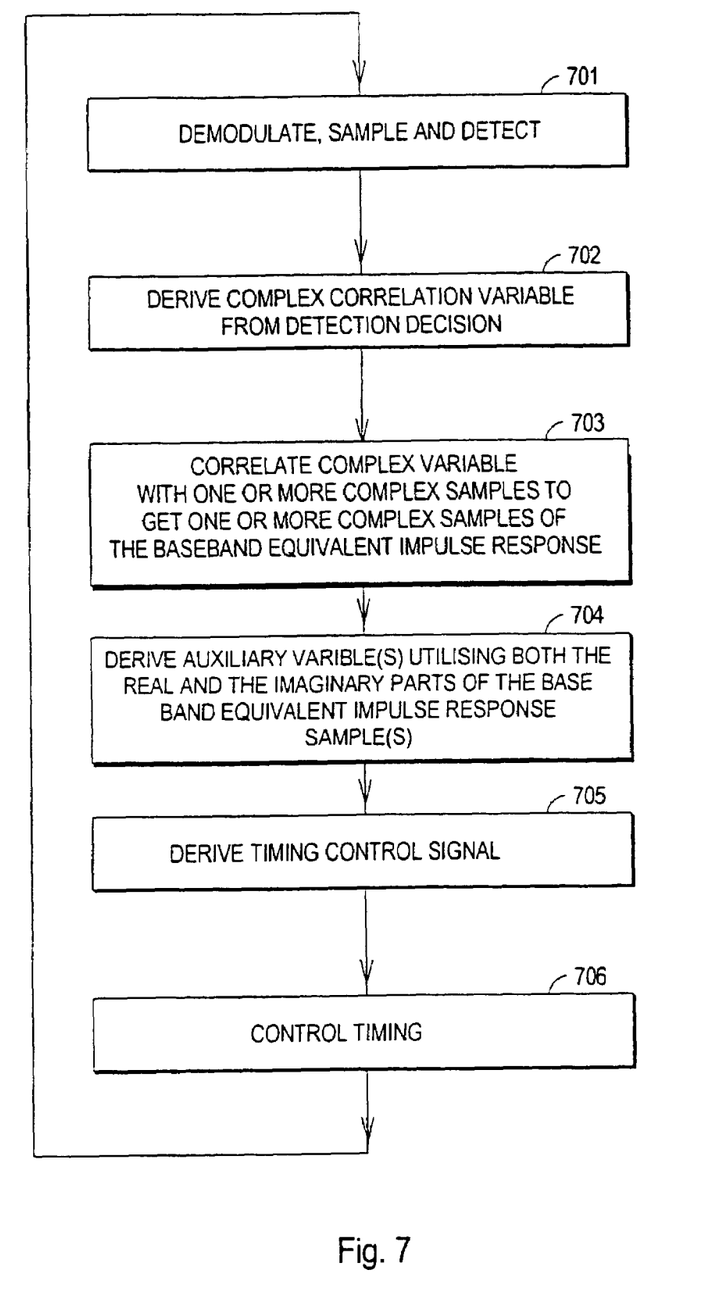

Schematically the method according to the invention constitutes a closed control loop. An embodiment of the method is illustrated in FIG. 7. A received signal is demodulated and sampled (or sampled and demodulated), and a detection decision is made at step 701. Many other signal processing operations may also be performed (e.g. equalising) but those are not presented in FIG. 7. The detection decision is converted into a complex correlation variable at step 702, and the result is correlated with one or more complex samples of the demodulated signal at step 703. One or more auxiliary variable(s) are constructed by utilising the information of both the real and the imaginary parts of the correlation result at step 704, and the obtained result is used to generate an actual timing control signal at step 705. The timing control step 706 has an effect on the timing of the sampling operation or on the operation of controllable digital filter at step 701, and the whole process is continuously repeated.

The above-explained embodiments of the invention are not meant to have a limiting effect on the scope of the accompanying claims. The fact that in the above-given description the number of baseband equivalent impulse response values and the number of auxiliary values are both five, is exemplary and it clear that this is not the only possible choice. Another exemplary part of the above-given description where descriptional clarity may cause difference to practical implementation is the arrangement of the correlation circuitry in relation to the delay line. In the description of prior art we have indicated that it is known and possible as such to optimize the calculations relating to the correlation step so that fewer multipliers and fewer filters are needed.

The invention claimed is:

1. An arrangement for synchronizing a receiver into a quadrature amplitude modulated signal, said receiver comprising
   a first controllable unit (601) arranged to respond to a timing control signal by controlling the timing by which a received signal is converted into demodulated complex samples in a process comprising sampling and demodulation in any order, and
   a symbol detector (603) arranged to produce in correspondence with the demodulated complex samples a detection decision (s) that represents a received symbol; characterized in that it comprises
   means (401, 402, 403, 404, 405, 406, 407, 408, 409, 410, 411, 412, 413, 414, 415, 602) for generating one or more complex baseband equivalent impulse response values (h1, h2, h3, h4, h5) for a QAM-channel as a correlation result by correlating one or more demodulated complex samples with a correlation variable (C) derived from the detection decision (s),
   means (421, 605, 604) for generating the timing control signal so that information of both the real part and the imaginary part of said complex baseband equivalent impulse response values are utilised.

2. An arrangement according to claim 1, characterized in that it comprises means (420) for deriving said complex correlation variable (C) from the detection decision (s) by applying the formula $$C = z \cdot (f_1 - j f_2),$$

where C is the complex correlation variable, z is a complex constant other than zero, $f_1 = f_1(s)$ is a first real valued function of the detection decision s, $f_2 = f_2(s)$ is a second real valued function of the detection decision s, and the functions $f_1$ and $f_2$ are additionally related to the real and imaginary parts of the detection decision s so that the sign of $f_1$ is the same as the sign of the real part and the sign of $f_2$ is the same as the sign of the imaginary part.

3. An arrangement according to claim 1, characterized in that said means for generating one or more complex baseband equivalent impulse response values comprise a delay line (401, 402, 403, 404, 405) for temporarily storing a number of demodulated complex samples, a number of multipliers (406, 407, 408, 409, 410) for multiplying a number of the temporarily stored demodulated complex samples with said complex correlation variable (C), and a number of low pass filters (411, 412, 413, 414, 415) for filtering the result of said multiplication.

4. An arrangement according to claim 1, characterized in that said means (421, 605, 604) for generating the timing control signal comprise means for constructing auxiliary variables which are insensitive to changes caused by cables rotating the baseband equivalent impulse response or by the phase difference between the transmitter modulator and the receiver demodulator.

5. An arrangement according to claim 4, characterized in that said means (421) for generating the timing control signal comprise means for obtaining the absolute values (moduluses) of the correlation results.

6. An arrangement according to claim 4, characterized in that said means (604) for generating the timing control signal comprise means for obtaining a linear combination of said auxiliary variables and a proportional integral controller the input of which is coupled to said means for obtaining a linear combination of auxiliary variables and the output of which is coupled to the first controllable unit.

7. A receiver for receiving, equalising, demodulating, sampling and detecting a quadrature amplitude modulated signal, comprising a controllable demodulator and sampler unit (601) arranged to respond to a timing control signal by controlling the timing by which a received signal is converted into complex samples in a process comprising sampling and demodulation in any order, and a symbol detector (603) arranged to produce a detection decision (s) that represents a received symbol; characterized in that it comprises means (420) for deriving a complex correlation variable (C) from the detection decision (s), means (401, 402, 403, 404, 405, 406, 407, 408, 409, 410, 411, 412, 413, 414, 415, 602) for generating one or more complex baseband equivalent impulse response values (h1, h2, h3, h4, h5) for a QAM-channel as a correlation result by correlating one or more demodulated complex samples with said correlation variable (C), means (421, 605, 604) for generating the timing control signal so that information of both the real part and the imaginary part of said complex baseband equivalent impulse response values are utilised, said means being coupled so as to provide the timing control signal to the controllable demodulator and sampler unit (601).

8. A method for synchronizing a receiver into a quadrature amplitude modulated signal, comprising the steps of converting (701) a received signal into demodulated complex samples with a controlled procedure which is responsive to a certain timing control signal and producing (701) in correspondence with the demodulated complex samples a detection decision that represents a received symbol; characterized in that it comprises the steps of generating one or more (703) correlation results having a real part and an imaginary part, by correlating one or more demodulated complex samples with a complex correlation variable derived from the detection decision, simultaneously using both the real and imaginary parts of said correlation result to construct (704) one or more auxiliary variables which are insensitive to changes caused by cables rotating the baseband equivalent impulse response or by the phase difference between the transmitter upmodulator and the receiver demodulator, generating (705) the timing control signal from said auxiliary variables.

9. A method according to claim 8, characterized in that it comprises a step of deriving (702) said complex correlation variable from the detection decision by by applying the formula $$C = z \cdot (f_1 - j f_2),$$

where C is the complex correlation variable, z is a complex constant other than zero, $f_1 = f_1(s)$ is a first real valued function of the detection decision s, $f_2 = f_2(s)$ is a second real valued function of the detection decision s, and the functions $f_1$ and $f_2$ are additionally related to the real and imaginary part of the detection decision s so that the sign of f, is the same as the sign of the real part and the sign of $f_2$ is the same as the sign of the imaginary part.

10. A method according to claim 8, characterized in that the step of generating (703) a correlation result comprises the substeps of storing a number of successive complex demodulated samples, multiplying one or more complex samples with said complex correlation variable and filtering the complex result of said multiplication; and the step of simultaneously using both the real and imaginary parts of said correlation result comprises the substep of utilising both the real and the imaginary parts of said correlation result constructing (704) one or more auxiliary variables which are insensitive to changes caused by cables rotating the baseband equivalent impulse response and by the phase difference between the transmitter upmodulator and the receiver demodulator.

* * * * *